United States Patent
Hirai

(10) Patent No.: US 10,865,812 B2
(45) Date of Patent: Dec. 15, 2020

(54) HYDRAULIC DEVICE THAT CONTROLS PULSATION IN FIRST OIL BY INCREASING ROTATION NUMBER OF SECOND PUMP

(71) Applicant: HONDA MOTOR CO., LTD., Tokyo (JP)

(72) Inventor: Shinichi Hirai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 53 days.

(21) Appl. No.: 16/056,625

(22) Filed: Aug. 7, 2018

(65) Prior Publication Data

US 2019/0048899 A1 Feb. 14, 2019

(30) Foreign Application Priority Data

Aug. 10, 2017 (JP) .................. 2017-155233

(51) Int. Cl.
*F15B 11/17* (2006.01)
*F16H 61/00* (2006.01)
(Continued)

(52) U.S. Cl.
CPC .............. *F15B 11/17* (2013.01); *F04B 11/00* (2013.01); *F04B 23/12* (2013.01); *F04B 49/007* (2013.01);
(Continued)

(58) Field of Classification Search
CPC ........ F15B 2211/275; F15B 2211/6306; F15B 2211/265; F15B 2211/2654; F15B 21/008;
(Continued)

(56) References Cited

U.S. PATENT DOCUMENTS

2007/0122298 A1* 5/2007 Lesther ................. F04C 11/001
 417/410.4
2012/0085441 A1* 4/2012 Park .................... F16H 61/0025
 137/565.11
(Continued)

FOREIGN PATENT DOCUMENTS

JP 2012-140912 7/2012
JP 2012-219947 11/2012
(Continued)

OTHER PUBLICATIONS

Japanese Office Action for Japanese Patent Application No. 2017-155233 dated Feb. 19, 2019.
(Continued)

*Primary Examiner* — Bryan M Lettman
*Assistant Examiner* — Timothy P Solak
(74) *Attorney, Agent, or Firm* — Amin, Turocy & Watson, LLP

(57) ABSTRACT

In a hydraulic control device, when it is detected that a pressure of first oil (output pressure) detected by an output pressure sensor pulsates, a transmission control unit as a TCU stops driving of a second pump or decreases a rotation number of the second pump as a first operation. Alternatively, when it is detected that the output pressure pulsates, the TCU increases the rotation number of the second pump to a rotation number (for example, maximum rotation number) that is higher than a target rotation number as a second operation.

6 Claims, 10 Drawing Sheets

(51) Int. Cl.
*F15B 21/00* (2006.01)
*F04B 49/00* (2006.01)
*F04B 11/00* (2006.01)
*F04B 23/12* (2006.01)
*F04B 49/02* (2006.01)
*F04B 49/20* (2006.01)
*F04C 14/06* (2006.01)
*F04C 14/12* (2006.01)
*F04C 11/00* (2006.01)
*F04C 15/00* (2006.01)
*F04C 14/08* (2006.01)
*F04C 28/02* (2006.01)
*F04C 14/26* (2006.01)
*F04C 14/02* (2006.01)
*F16H 61/662* (2006.01)

(52) U.S. Cl.
CPC .............. *F04B 49/02* (2013.01); *F04B 49/20* (2013.01); *F04C 11/001* (2013.01); *F04C 14/02* (2013.01); *F04C 14/06* (2013.01); *F04C 14/08* (2013.01); *F04C 14/12* (2013.01); *F04C 14/26* (2013.01); *F04C 15/0049* (2013.01); *F04C 28/02* (2013.01); *F15B 21/008* (2013.01); *F16H 61/0031* (2013.01); *F04B 2205/13* (2013.01); *F04C 2270/14* (2013.01); *F15B 2211/20576* (2013.01); *F15B 2211/2654* (2013.01); *F15B 2211/6651* (2013.01); *F15B 2211/8616* (2013.01); *F16H 61/662* (2013.01)

(58) Field of Classification Search
CPC .. F15B 2211/8616; F04C 13/00; F04C 28/02; F04C 14/02; F04C 14/06; F04C 14/065; F04C 14/12; F04C 14/08; F04C 15/0049; F04C 2270/14; F04C 2270/05; F04C 2270/145; F04B 11/00; F04B 11/041; F04B 11/0091; F04B 23/12; F04B 2205/13; F04B 39/0027; F04B 11/0041
See application file for complete search history.

(56) References Cited

U.S. PATENT DOCUMENTS

| | | | |
|---|---|---|---|
| 2013/0280101 A1 | 10/2013 | Imai et al. | |
| 2014/0064990 A1* | 3/2014 | Jo | F16H 61/0031 417/253 |
| 2015/0316144 A1* | 11/2015 | Yoshitani | F16H 61/0021 475/31 |
| 2018/0321079 A1 | 11/2018 | Sugimoto et al. | |

FOREIGN PATENT DOCUMENTS

| | | |
|---|---|---|
| JP | 2015-200369 | 11/2015 |
| WO | 2014/097345 | 6/2014 |
| WO | 2017/065249 | 4/2017 |

OTHER PUBLICATIONS

Japanese Office Action for Japanese Patent Application No. 2017-155233 dated May 7, 2019.

* cited by examiner

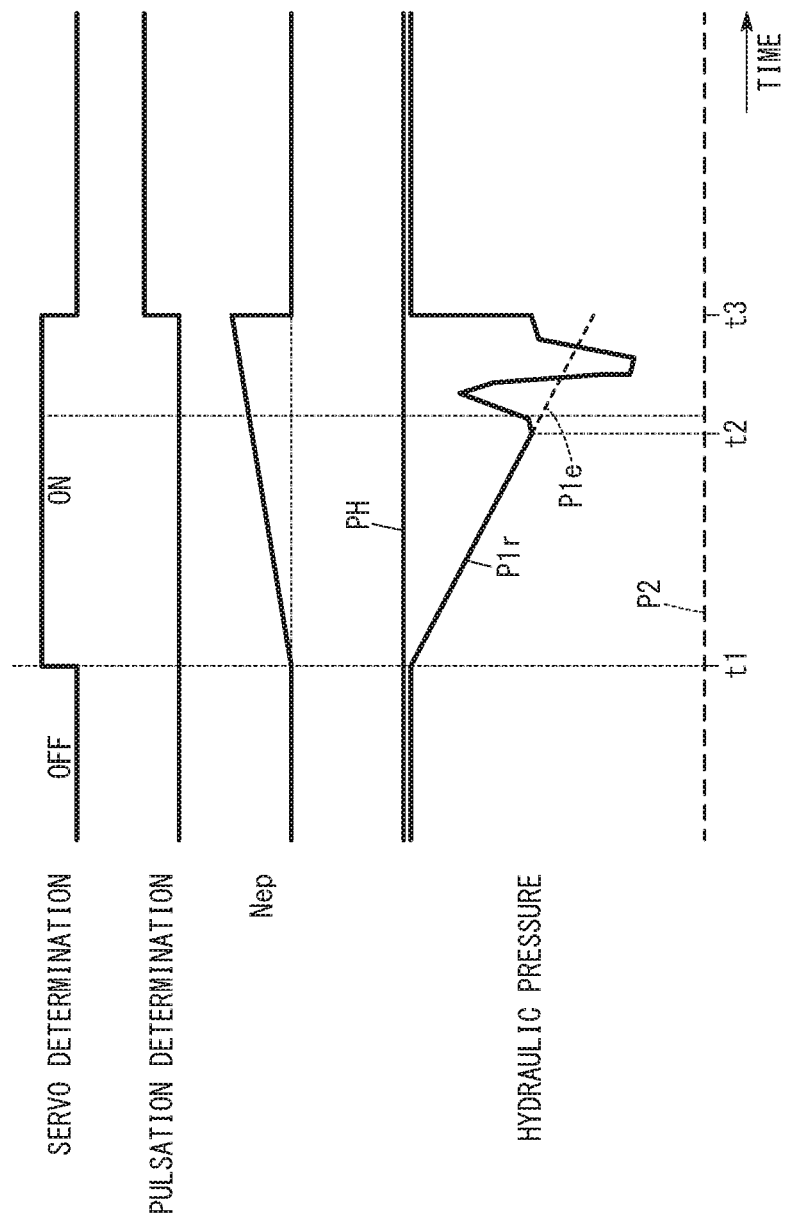

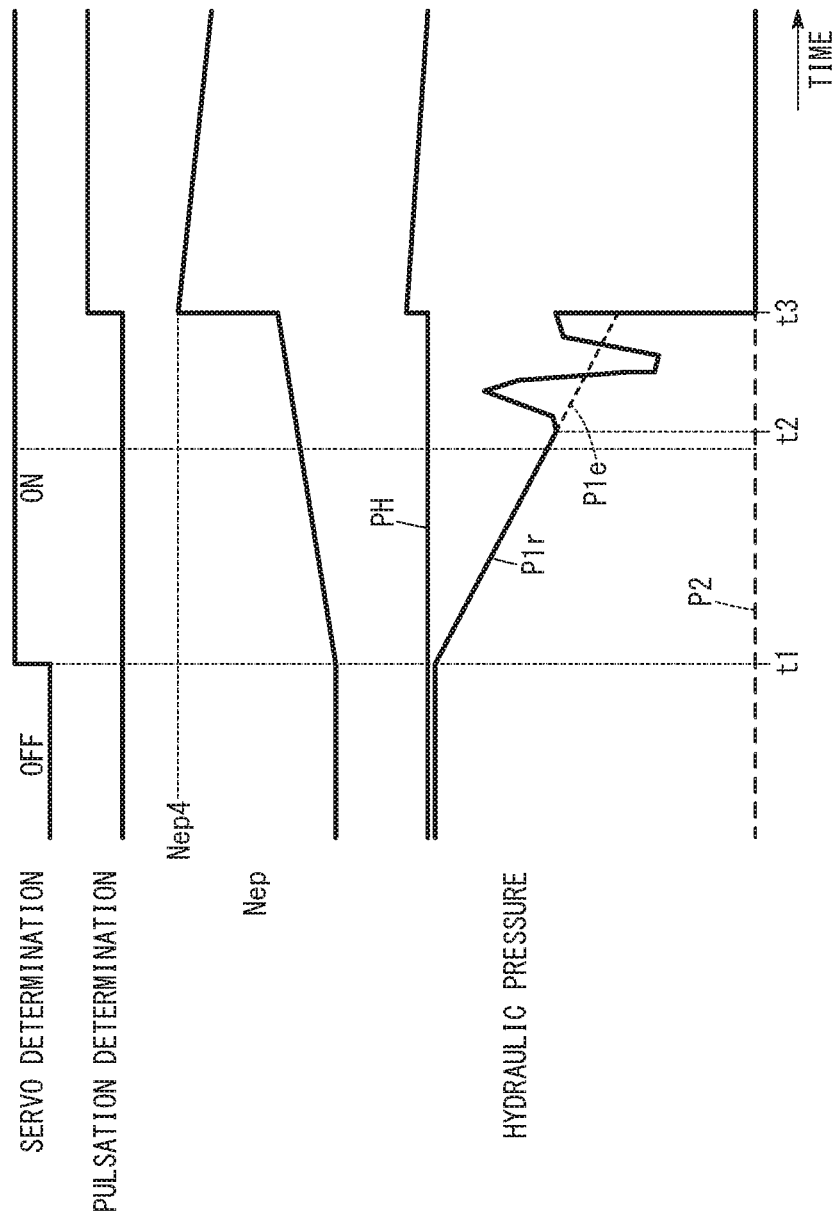

HYDRAULIC DEVICE THAT CONTROLS PULSATION IN FIRST OIL BY INCREASING ROTATION NUMBER OF SECOND PUMP

CROSS-REFERENCE TO RELATED APPLICATION

This application is based upon and claims the benefit of priority from Japanese Patent Application No. 2017-155233 filed on Aug. 10, 2017, the contents of which are incorporated herein by reference.

BACKGROUND OF THE INVENTION

Field of the Invention

The present invention relates to a hydraulic control device that has, between a first pump and a hydraulic operation unit, a second pump and a bypass valve connected in parallel, and that supplies first oil from the first pump to the hydraulic operation unit through the bypass valve, or pressurizes the first oil with the second pump and supplies the first oil that has been pressurized to the hydraulic operation unit as second oil.

Description of the Related Art

For example, Japanese Laid-Open Patent Publication No. 2015-200369 discloses a hydraulic control device in a transmission of a vehicle that has, between a first pump that is mechanical and a hydraulic operation unit of the transmission, a bypass valve (non-return valve) and a second pump that is electric connected in parallel. In this case, when an engine is started, first of all, first oil is supplied from the first pump to the hydraulic operation unit through the bypass valve. After that, the second pump is driven to pressurize the first oil that is supplied from the first pump and supplies the first oil that is pressurized from the second pump to the hydraulic operation unit as second oil.

SUMMARY OF THE INVENTION

Incidentally, the load on the first pump can be reduced if the pressure of the first oil can be reduced while the second pump is driven. However, reducing the pressure of the first oil while increasing the rotation number of the second pump may cause the pressure to pulsate. This is because hunting, that is, repeated opening and closing of a bypass valve corresponding to a non-return valve occur due to a change in flow rate of the first oil and the second oil as the rotation number of the second pump is increased or the pressure of the first oil is reduced, or due to an influence of each discharging frequency (rotating frequency) of the first pump and the second pump. As a result, there is a possibility that the pressure of the second oil to be supplied to the hydraulic operation unit also pulsates.

The present invention is an improvement of the hydraulic control device according to Japanese Laid-Open Patent Publication No. 2015-200369, and an object is to provide a hydraulic control device that can suppress the pulsation in the pressure of the first oil.

The present invention relates to a hydraulic control device including, between a first pump and a hydraulic operation unit, a second pump and a bypass valve connected in parallel and configured to supply first oil from the first pump to the hydraulic operation unit through the bypass valve, or pressurize the first oil that is supplied from the first pump with the second pump and supply the first oil that has been pressurized to the hydraulic operation unit as second oil.

In this case, the hydraulic control device further includes a first flow passage configured to connect between the first pump, the second pump, the bypass valve, and allow the first oil to flow therein, a pressure detection unit configured to detect a pressure of the first oil flowing in the first flow passage, and a controller configured to control driving of the second pump.

In order to achieve the above object, the controller has the following first characteristic or second characteristic.

As the first characteristic, if the pressure of the first oil that is detected by the pressure detection unit pulsates, the controller is configured to stop the driving of the second pump or decrease a rotation number of the second pump.

Thus, the first oil is directly supplied from the first pump to the hydraulic operation unit through the bypass valve or the second oil with the pressure close to the pressure of the first oil is supplied from the second pump to the hydraulic operation unit. As a result, a stable state in which the pressure of the oil to be supplied to the hydraulic operation unit is the pressure of the first oil or the pressure of the second oil that is close to the pressure of the first oil can be obtained quickly. Therefore, hunting at the bypass valve can be suppressed and the pulsation can be suppressed quickly.

As the second characteristic, if the pressure of the first oil that is detected by the pressure detection unit pulsates, the controller is configured to increase a rotation number of the second pump to a first rotation number that is higher than a target rotation number.

Thus, the workload of the second pump increases temporarily; however, since the pressure of the second oil rapidly increases, the bypass valve is maintained in the closed state due to the pressure of the second oil. The second oil with such a high pressure is supplied to the hydraulic operation unit; therefore, the pressure of the first oil can be reduced and the stable state with the low pressure can be quickly obtained. As a result, the hunting at the bypass valve can be suppressed and the pulsation can be quickly suppressed, and moreover, the load on the first pump can be reduced.

In the second characteristic, the controller may be configured to decrease the rotation number of the second pump from the first rotation number to a second rotation number that is a little higher than the target rotation number. Thus, the workload of the second pump can be cut while the pulsation is prevented and the load on the first pump is reduced; therefore, the second pump can be efficiently operated near the target rotation number corresponding to an optimal operation point. In addition, at the rotation number that is lower than the target rotation number, the pressure of the first oil becomes higher so that the first pump is loaded more. Therefore, by setting the rotation number to the second rotation number that is a little higher than the target rotation number, the above effect can be obtained easily.

In this case, the second rotation number may be a rotation number that is a little higher than a rotation number where a primary component of a discharging frequency of the first pump and a primary component of a discharging frequency of the second pump overlap. At the rotation number where the primary components overlap, the pulsation may become large. In view the above, the rotation number of the second pump is decreased to the second rotation number so as not to get close to the aforementioned rotation number. Thus, the second pump can be operated efficiently while the pulsation is suppressed.

The hydraulic control device may further include a control valve provided at the first flow passage and configured to connect between the first pump, the bypass valve, and the second pump, and configured to supply the first oil to another hydraulic operation unit through a second flow passage when operating using a pressure of the first oil or the second oil as a pilot pressure. In a case where the second pump supplies the second oil to the hydraulic operation unit and the control valve, the control valve may be configured to operate using the pressure of the second oil as the pilot pressure so as to supply the first oil to the second pump through the first flow passage and supply the first oil to the other hydraulic operation unit through the second flow passage.

Thus, by adjusting the supply of the first oil from the first flow passage to the second flow passage while using the pressure of the second oil as the pilot pressure, the pressure of the first oil can be reduced. As a result, while the pulsation of the pressure of the first oil is suppressed at the driving of the second pump, the pressure of the first oil can be reduced and the load on the first pump can be reduced.

The hydraulic control device may further include a third flow passage configured to connect between an output side of the second pump and the control valve. In a case where the second pump supplies the second oil to the hydraulic operation unit and the control valve, the control valve may be configured to operate using the pressure of the second oil as the pilot pressure so as to connect between the first flow passage and the third flow passage and maintain the pressure of the second oil to a predetermined pressure.

Thus, after the second pump is driven, the pressure of the second oil can be prevented from becoming an abnormal state.

In addition, if increasing the rotation number of the second pump to the first rotation number fails to suppress pulsation, the controller may be configured to stop the driving of the second pump or decrease the rotation number of the second pump to an idling rotation number. Thus, the unnecessary workload of the second pump can be avoided.

In the first characteristic or the second characteristic, the controller may be configured to determine whether the pulsation occurs on a basis of a difference between the pressure of the first oil detected by the pressure detection unit and an estimated value of the pressure. If it is determined that the pulsation does not occur, the controller may be configured to increase the rotation number of the second pump. On the other hand, if it is determined that the pulsation occurs, the controller may be configured to stop the driving of the second pump or decrease the rotation number of the second pump, or increase the rotation number of the second pump to a first rotation number.

Thus, on the basis of the determination result as to whether the pulsation occurs, the second pump can be driven as appropriate.

In addition, the first pump may be a pump that is driven by an engine of a vehicle, the second pump may be a pump that is driven by a motor of the vehicle, the hydraulic operation unit may be a unit configured to operate when the first oil or the second oil is supplied in a transmission of the vehicle, and the controller may be configured to control the driving of the motor so as to control the rotation number of the second pump.

Thus, in the first characteristic, the power consumption of the motor and the second pump can be suppressed and the fuel efficiency of the vehicle can be improved while the pulsation of the pressure of the first oil is suppressed. On the other hand, in the case of the second characteristic, since the rotation number of the second pump increases to the first rotation number once, the power consumption (current consumption) of the second pump and the motor increases temporarily. However, after that, by decreasing the rotation number of the second pump to the second rotation number, the pulsation of the pressure of the first oil can be suppressed and the fuel efficiency of the vehicle can be secured.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 8 is a timing chart expressing a first operation of the hydraulic control device;

FIG. 9 is a timing chart expressing a second operation of the hydraulic control device.

DESCRIPTION OF THE PREFERRED EMBODIMENTS

A preferred embodiment of a hydraulic control device according to the present invention will hereinafter be described in detail with reference to the attached drawings.

[1. Structure of the Present Embodiment]

Figure 1:
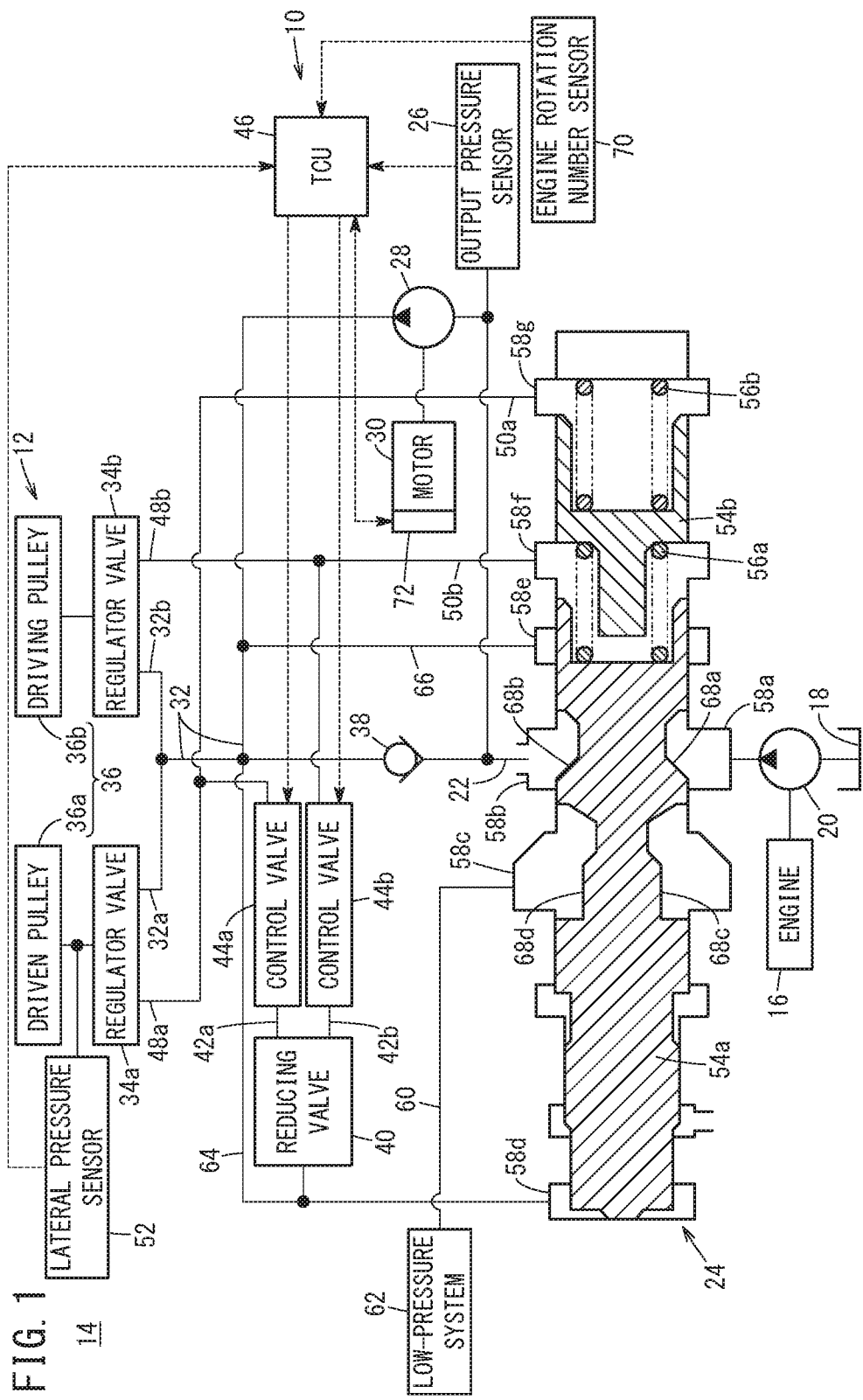
FIG. 1 is a structure diagram of a hydraulic control device according to the present embodiment.

FIG. 1 is a structure diagram of a hydraulic control device 10 according to the present embodiment. The hydraulic control device 10 is used in, for example, a vehicle 14 including a transmission 12 corresponding to a continuously variable transmission (CVT).

The hydraulic control device 10 includes a first pump 20 that is a gear pump driven by an engine 16 of the vehicle 14 and pumps up oil (hydraulic oil) stored in a reservoir 18 and transfers the oil with pressure. An output side of the first pump 20 is connected to an oil passage (first flow passage) 22. The oil that is transferred with pressure from the first pump 20 flows as first oil in the oil passage 22. In the middle of the oil passage 22, a line pressure control valve 24 corresponding to a spool valve is provided. In the oil passage 22, an output pressure sensor (pressure detection unit) 26 is disposed downstream of the line pressure control valve 24. The output pressure sensor 26 detects a pressure (output pressure of the first pump 20) P1 of the first oil that flows in the oil passage 22. On the downstream side in the oil passage 22, a second pump 28 is connected. The second pump 28 is a gear pump (electric pump) that is driven by a rotation of a motor 30 included in the vehicle 14, and that pressurizes the first oil supplied through the oil passage 22 and transfers with pressure the first oil that is pressurized as second oil.

An output side of the second pump 28 is connected to an oil passage 32. The oil passage 32 is branched into two oil passages 32a, 32b on the downstream side. The one oil passage 32a is connected through a regulator valve 34a to a driven pulley 36a included in a continuously variable transmission mechanism 36 of the transmission 12. The other oil passage 32b is connected through a regulator valve 34b to a driving pulley 36b included in the continuously variable transmission mechanism 36.

Between the two oil passages 22, 32, a bypass valve 38 and the second pump 28 are connected in parallel. The bypass valve 38 is a non-return valve provided to bypass the second pump 28, and allows the oil (first oil) to flow from the oil passage 22 on the upstream side to the oil passage 32 on the downstream side, and prevents the oil (second oil) from flowing from the oil passage 32 on the downstream side to the oil passage 22 on the upstream side.

To the oil passage 32, a reducing vale 40 is connected. The reducing valve 40 reduces the pressure of the second oil and outputs the second oil with the reduced pressure as third oil. To an output side of the reducing valve 40, two control valves 44a, 44b are connected through oil passages 42a, 42b, respectively. To the control valves 44a, 44b, the third oil is supplied. Each of the control valves 44a, 44b is a normally open electromagnetic valve with a solenoid. The control valves 44a, 44b are closed while a control signal is supplied from a transmission control unit (TCU) 46 that is described below and current flows to the solenoids, and on the other hand, the control valves 44a, 44b are open while current does not flow in the solenoid.

Thus, the one control valve 44a supplies the third oil to the regulator valve 34a through an oil passage 48a, and supplies the third oil to the line pressure control valve 24 through an oil passage 50a. In addition, the other control valve 44b supplies the third oil to the regulator valve 34b through an oil passage 48b, and supplies the third oil to the line pressure control valve 24 through an oil passage 50b.

Therefore, the one regulator valve 34a uses the pressure of the third oil supplied through the oil passage 48a, as a pilot pressure. If the pressure of the oil (hereinafter referred to as line pressure PH) supplied through the oil passages 32, 32a is more than or equal to a predetermined pressure, the regulator valve 34a is open to supply the oil to the driven pulley 36a disposed downstream. Between the regulator valve 34a and the driven pulley 36a, a lateral pressure sensor 52 is disposed. The lateral pressure sensor 52 detects the pressure of the oil to be supplied to the driven pulley 36a (line pressure PH that also corresponds to a pulley pressure as a lateral pressure of the driven pulley 36a).

In addition, the other regulator valve 34b uses the pressure of the third oil supplied through the oil passage 48b, as the pilot pressure. If the pressure of the oil (line pressure PH) supplied through the oil passages 32, 32b is more than or equal to the predetermined pressure, the regulator valve 34b is open to supply the oil to the driving pulley 36b disposed downstream.

The control valve 44a can regulate the pressure of the third oil output to the oil passages 48a, 50a. The control valve 44b can regulate the pressure of the third oil output to the oil passages 48b, 50b.

The line pressure control valve 24 is a spool value incorporating a first spool 54a and a second spool 54b. The first spool 54a is a relatively long valve body and a cross section thereof is shaped like a letter of I. The first spool 54a is disposed along an axial direction (left-right direction in FIG. 1) inside the line pressure control valve 24. The second spool 54b is a spool that is shorter than the first spool 54a, and a cross section thereof is shaped like a letter of Y. The second spool 54b is disposed along the axial direction inside the line pressure control valve 24 on the right side of the first spool 54a. In this case, between the first spool 54a and the second spool 54b, a first elastic member 56a is inserted. The first elastic member 56a energizes the first spool 54a in a left direction in FIG. 1. The second spool 54b is energized toward the first spool 54a by a second elastic member 56b that is disposed on the right side of the second spool 54b.

The line pressure control valve 24 includes a first port 58a to a seventh port 58g. The first port 58a and the second port 58b are provided at a central part of an outer peripheral surface of the line pressure control valve 24 so as to face each other. Regardless of a position of the first spool 54a, the first port 58a and the second port 58b are connected to each other by, for example, a groove (not shown) formed around the axis on an inner peripheral surface side of the line pressure control valve 24. The first port 58a and the second port 58b constitute a part of the oil passage 22. In this case, the first port 58a is an inlet port in the line pressure control valve 24 where the first oil enters, and the second port 58b is an outlet port where the first oil exits.

Then, assuming that the position of the second port 58b on the outer peripheral surface of the line pressure control valve 24 is a center, the third port 58c and the fourth port 58d are provided in order on the left side in FIG. 1 so as to separate from the second port 58b, and on the other hand, on the right side in FIG. 1, the fifth port 58e to the seventh port 58g are provided in order so as to separate from the second port 58b.

The third port 58c is provided adjacently on the left side of the second port 58b, and is connected to a low-pressure system 62 as another hydraulic operation unit of the transmission 12 through an oil passage (second flow passage) 60. Note that the low-pressure system 62 may be a torque converter, a clutch, or the like to which the first oil with the pressure lower than the pressure of the second oil is supplied. The fourth port 58d is provided at a left end of the line pressure control valve 24, and is connected to the oil passage 32 through an oil passage 64.

The fifth port 58e is provided adjacently on the right side of the second port 58b, and is connected to the oil passage 32 through an oil passage (third flow passage) 66. The sixth port 58f is provided on the right side of the fifth port 58e, and is connected to the oil passage 50b. The seventh port 58g is provided at a right end of the line pressure control valve 24, and is connected to the oil passage 50a.

Therefore, to the fourth port 58d and the fifth port 58e, the oil (first oil or the second oil) that flows in the oil passage 32 is supplied through the oil passages 64, 66, respectively. To the sixth port 58f, the third oil is supplied from the control valve 44b through the oil passage 50b. In addition, to the seventh port 58g, the third oil is supplied from the control valve 44a through the oil passage 50a.

A groove is formed around the axis in a part of the outer peripheral surface of the first spool 54a that faces the first port 58a and the second port 58b. Thus, the part that faces the first port 58a is formed as a concave part 68a and the part that faces the second port 58b is formed as a concave part 68b. In addition, a groove is formed around the axis in a part of the outer peripheral surface of the first spool 54a that faces the third port 58c. Thus, a concave part 68c is formed adjacent to the concave part 68a and a concave part 68d is formed adjacent to the concave part 68b.

The hydraulic control device 10 further includes an engine rotation number sensor 70 that detects an engine rotation number New of the engine 16 (rotation number Nmp of the first pump 20), and a driver 72 that controls the driving of the motor 30. The driver 72 controls the driving of the motor 30 on the basis of the control signal supplied from the TCU 46, and on the other hand, outputs the signal expressing the driving state of the motor 30 (for example, the rotation number Nem of the motor 30 (rotation number Nep of the second pump 28)) to the TCU 46.

The TCU 46 is a controller of the transmission 12, and controls the transmission 12 on the basis of the output pressure P1 that is sequentially detected by the output pressure sensor 26, the line pressure (lateral pressure) PH that is sequentially detected by the lateral pressure sensor 52, the engine rotation number New that is sequentially detected by the engine rotation number sensor 70, and the rotation number Nem that is sequentially output from the driver 72. For example, the TCU 46 controls the driving of the motor 30 through the driver 72 on the basis of the output pressure P1 detected by the output pressure sensor 26.

Since the continuously variable transmission mechanism 36, the low-pressure system 62, and the like in the transmission 12 are well known, the detailed description thereof is omitted.

[2. Basic Operation of the Present Embodiment]

A basic operation of the hydraulic control device 10 according to the present embodiment with the above structure is described with reference to FIG. 2 and FIG. 3. Here, the description is given concerning a case in which only the first pump 20 is driven (see FIG. 2) and a case in which both the first pump 20 and the second pump 28 are driven (see FIG. 3).

Figure 2:
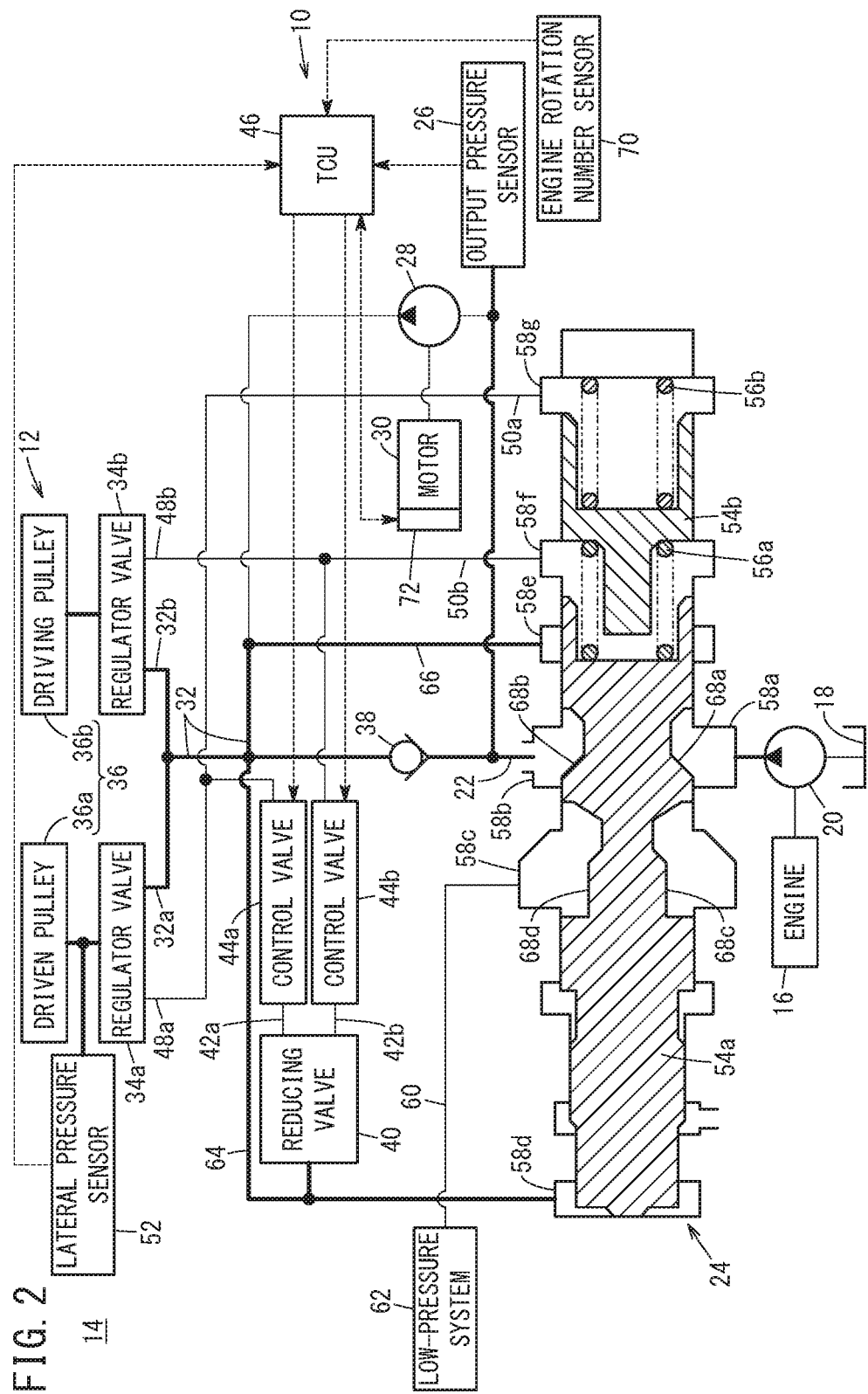
FIG. 2 is a structure diagram illustrating a case in which oil is supplied to each pulley by driving a first pump only.

<2. 1 Operation in FIG. 2>

When the driving of the first pump 20 is started by the driving of the engine 16, the first pump 20 pumps up the oil of the reservoir 18 and starts to transfer the pumped oil with pressure as the first oil. Thus, the first oil flows in the oil passage 22 through the first port 58a and the second port 58b as shown by a thick line in FIG. 2. The output pressure sensor 26 sequentially detects the pressure (output pressure) P1 of the first oil flowing in the oil passage 22, and outputs the signal expressing the detection result to the TCU 46. The engine rotation number sensor 70 sequentially detects the engine rotation number New, and sequentially outputs the signal expressing the detection result to the TCU 46.

In this case, since the motor 30 is not driven, the first oil flowing in the oil passage 22 flows to the oil passage 32 through the bypass valve 38. Thus, the first oil is supplied to the fourth port 58d through the oil passages 32, 64, supplied to the fifth port 58e through the oil passages 32, 66, and supplied to the reducing valve 40. The reducing valve 40 reduces the pressure of the first oil that is supplied, and supplies the first oil with the reduced pressure to the control valves 44a, 44b through the oil passages 42a, 42b as the third oil.

Here, the control signals are supplied in advance from the TCU 46 to the solenoids of the control valves 44a, 44b, and the control valves 44a, 44b are in a closed state. Then, by stopping the supply of the control signal to each solenoid, the control valves 44a, 44b are switched from the closed state to an open state. Thus, the control valve 44a supplies the third oil to the regulator valve 34a through the oil passage 48a, and supplies the third oil to the seventh port 58g through the oil passage 50a. In addition, the control valve 44b supplies the third oil to the regulator valve 34b through the oil passage 48b, and supplies the third oil to the sixth port 58f through the oil passage 50b.

The regulator valve 34a uses the pressure of the third oil supplied through the oil passage 48a, as the pilot pressure. If the pressure of the first oil is more than or equal to a predetermined pressure, the regulator valve 34a is opened to supply the first oil to the driven pulley 36a. The lateral pressure sensor 52 sequentially detects the pressure of the first oil supplied to the driven pulley 36a (line pressure PH as the lateral pressure), and sequentially outputs the signal expressing the detection result to the TCU 46.

On the other hand, the regulator valve 34b uses the pressure of the third oil supplied through the oil passage 48b, as the pilot pressure. If the pressure of the first oil is more than or equal to the predetermined pressure, the regulator valve 34b is opened to supply the first oil to the driving pulley 36b.

Note that in the line pressure control valve 24, the first oil is supplied to the fourth port 58d, the third oil is supplied to the sixth port 58f, and the third oil is supplied to the seventh port 58g. In this case, the pressure of the first oil (line pressure PH, output pressure P1) is higher than the pressure of the third oil. However, since the area of the valve that is in contact with the oil is different, the pressure is balanced. When the oil with the pressure higher than the balanced point is supplied to the fourth port 58d, the first spool 54a shifts in the right direction in FIG. 2 by the line pressure PH against the elastic force of the first elastic member 56a and the pressure of the third oil. Thus, the concave part 68c and the first port 58a are connected so that the first oil can be supplied to the low-pressure system 62 through the first port 58a, the concave parts 68c, 68d, the third port 58c, and the oil passage 60.

Figure 3:
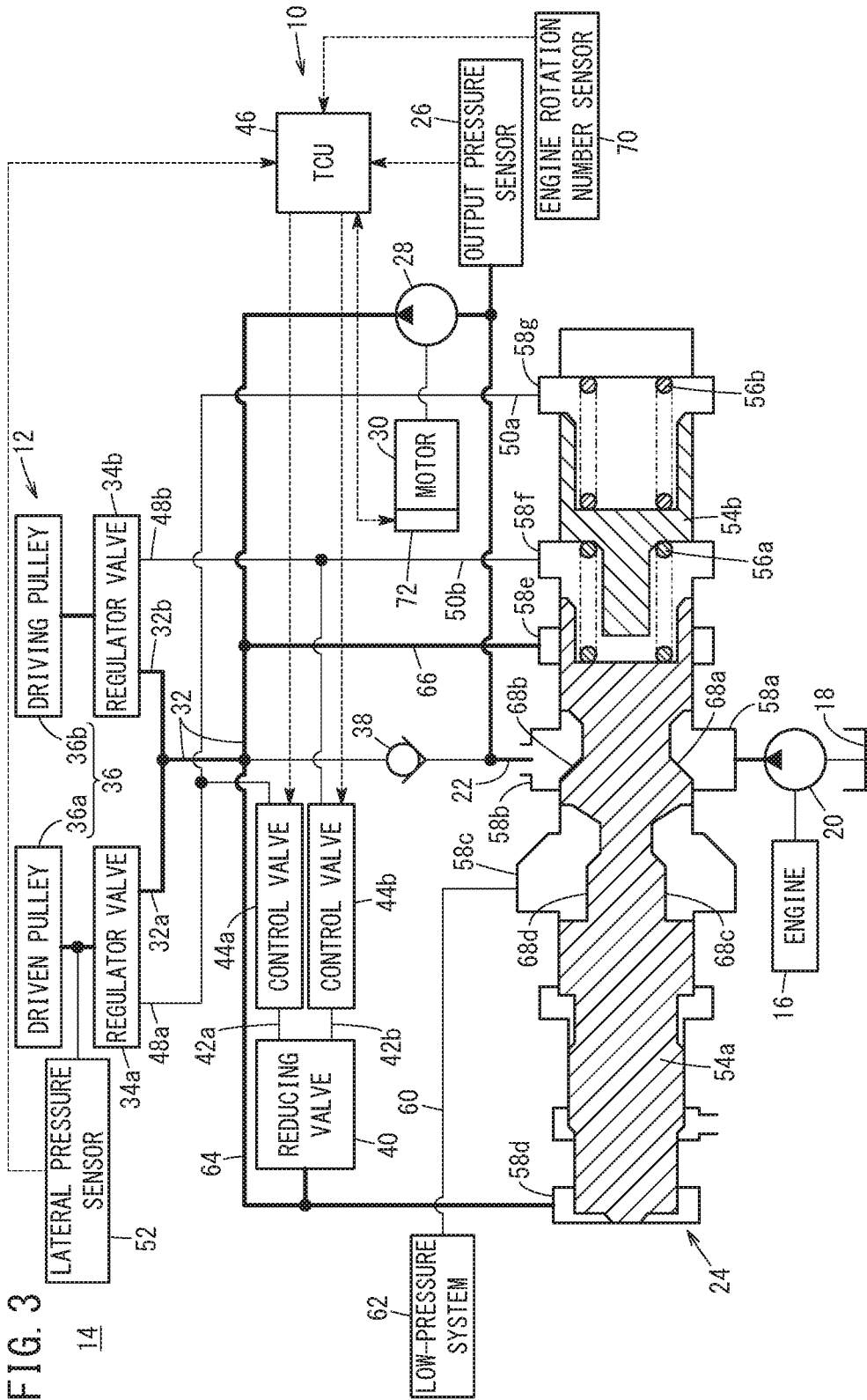
FIG. 3 is a structure diagram illustrating a case in which the oil is supplied to each pulley by driving of both the first pump and a second pump.

<2. 2 Operation in FIG. 3>

Next, an operation in FIG. 3 is described. When the control signal is supplied from the TCU 46 to the driver 72 in a state that the first pump 20 is driven by the operation in FIG. 2, the driver 72 drives the motor 30 on the basis of the control signal and drives the second pump 28. Thus, the second pump 28 pressurizes the first oil that flows in the oil passage 22, and starts to transfer with pressure the first oil that is pressurized as the second oil. As a result, the second oil is supplied to the fourth port 58d through the oil passages 32, 64, supplied to the fifth port 58e through the oil passages 32, 66, and supplied to the reducing valve 40 as shown by thick lines in FIG. 3.

Note that in FIG. 3, the thick lines also show the supply of the first oil and the second oil. Then, when the second oil that is pressurized flows in the oil passage 32 and the flow rate of the second oil (discharging flow rate of the second pump 28) exceeds the flow rate of the first oil (discharging flow rate of the first pump 20), the pressure of the oil (line pressure PH) on the oil passage 32 side becomes higher than the pressure of the oil (output pressure P1) on the oil passage 22 side in the bypass valve 38. Thus, the bypass valve 38 is closed and the supply of the first oil to the oil passage 32 is stopped. Note that the driver 72 sequentially outputs the signal expressing the rotation number Nem of the motor 30 (rotation number Nep of the second pump 28) to the TCU 46.

The reducing valve 40 reduces the pressure of the second oil that is supplied, and supplies the second oil with the reduced pressure to the control valves 44a, 44b through the oil passages 42a, 42b, respectively as the third oil. Since the control valve 44a is open, the third oil is supplied to the regulator valve 34a through the oil passage 48a and the third oil is supplied to the seventh port 58*g* through the oil passage 50*a*. In addition, since the control valve 44*b* is open, the third oil is supplied to the regulator valve 34*b* through the oil passage 48*b* and the third oil is supplied to the sixth port 58*f* through the oil passage 50*b*.

As a result, the regulator valve 34*a* uses the pressure of the third oil supplied through the oil passage 48*a*, as the pilot pressure and supplies the pressure of the second oil to the driven pulley 36*a*. The lateral pressure sensor 52 sequentially detects the pressure of the second oil supplied to the driven pulley 36*a* (line pressure PH), and outputs the detected pressure to the TCU 46. On the other hand, the regulator valve 34*b* uses the pressure of the third oil supplied through the oil passage 48*b* as the pilot pressure, and supplies the pressure of the second oil to the driving pulley 36*b*.

Thus, since the second oil that is pressurized (PH>P1) is supplied to the driven pulley 36*a* and the driving pulley 36*b*, the pressure (output pressure) P1 of the first oil can be reduced so as to reduce the load on the first pump 20. Methods of reducing the output pressure P1 include: a method in which, in the case where the rotation number Nmp of the first pump 20 is a certain rotation number, the first spool 54*a* is shifted in the right direction in FIG. 1 and FIG. 3 using the pressure of the second oil (line pressure PH) supplied to the fourth port 58*d* of the line pressure control valve 24 as the pilot pressure, and since the opening (opening area) between the first port 58*a* and the concave part 68*c* is increased, the output pressure P1 is reduced; and a method in which the rotation number Nmp of the first pump 20 is decreased so that the output pressure P1 is reduced. The following description is mainly given concerning the case where the rotation number Nmp is a certain rotation number, the first spool 54*a* is shifted to change the opening area between the first port 58*a* and the concave part 68*c*, so that the output pressure P1 is reduced.

In the line pressure control valve 24, the third oil is supplied to the sixth port 58*f* and the seventh port 58*g*. In this case, since the line pressure PH is higher than the pressure of the third oil, the first spool 54*a* shifts further in the right direction in FIG. 3 against the elastic force of the first elastic member 56*a* and the pressure of the third oil. Thus, the concave part 68*b* and the fifth port 58*e* are connected to each other so as to connect between the oil passage 22 and the oil passage 66. As a result, the increase in pressure of the second oil (line pressure PH) to be supplied to the oil passage 66 can be suppressed, and the line pressure PH can be maintained to the predetermined pressure.

[3. Characteristic Operation of the Present Embodiment]

Next, a characteristic operation of the hydraulic control device 10 according to the present embodiment will be described with reference to FIG. 4 to FIG. 10. Here, description is given concerning a problem when the pressure (output pressure) P1 of the first oil is reduced while the rotation number Nep of the second pump 28 is increased in the operation in FIG. 3 described above, and a method (a first operation, a second operation) for solving the problem.

<3. 1 Problem>

Figure 4:
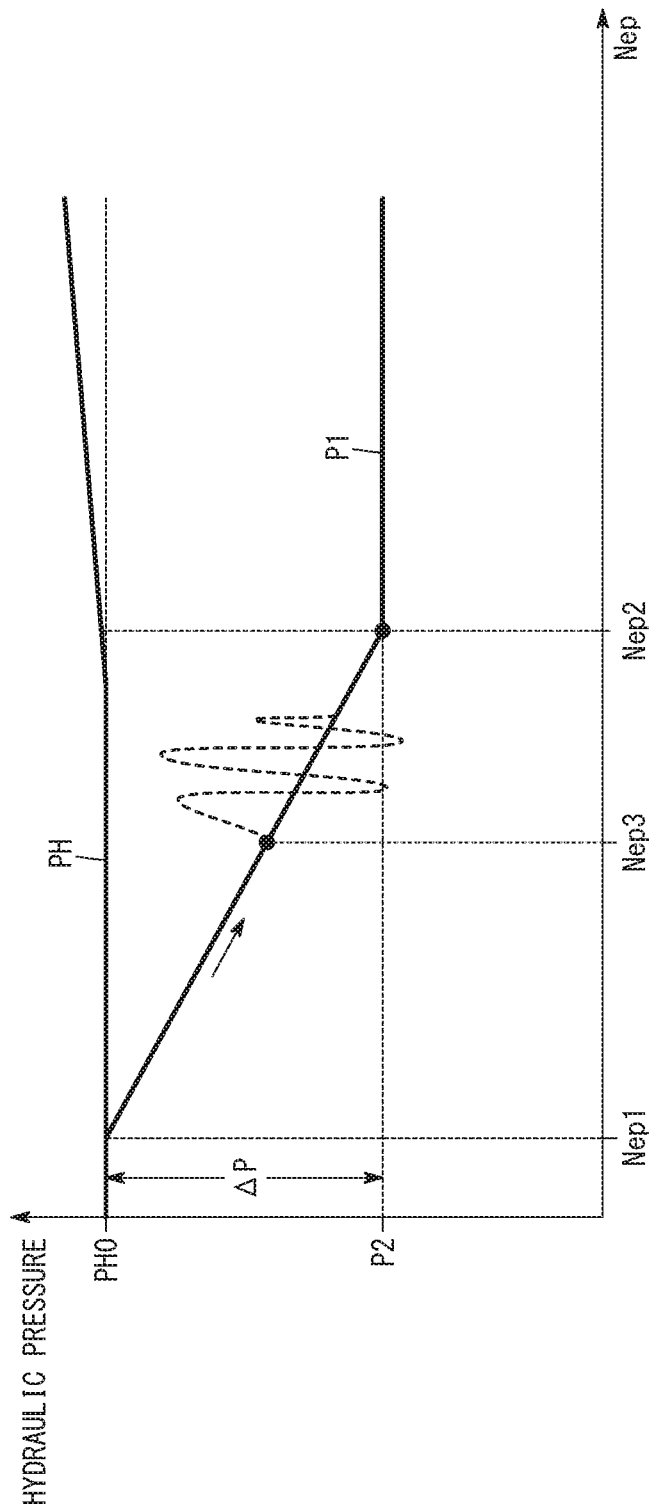
FIG. 4 is a diagram expressing a relation between a hydraulic pressure and a rotation number of the second pump.

FIG. 4 is an explanatory diagram expressing the above problem. Here, the description is made of a case in which the higher line pressure PH is necessary when the speed of the continuously variable transmission mechanism 36 is changed, and therefore the second pump 28 is driven to increase the rotation number Nep of the second pump 28.

In FIG. 4, the horizontal axis indicates the rotation number Nep of the second pump 28 and the vertical axis indicates the output pressure P1 and the line pressure PH (hydraulic pressure). Note that depending on whether the second pump 28 is driven, the line pressure PH may be the output pressure P1 or the pressure of the second oil.

If the line pressure PH is PH0, the output operation of the second oil by the second pump 28 (servo state) is started when the rotation number Nep of the second pump 28 is increased to reach Nep1. In this case, when the flow rate of discharging the second oil from the second pump 28 exceeds the flow rate of discharging the first oil from the first pump 20, the bypass valve 38 is closed so that the second oil can be supplied in the servo state. After that, in order to reduce the load on the first pump 20, the rotation number Nep of the second pump 28 is increased further. Thus, the rotation number Nmp of the first pump 20 is maintained to be a certain rotation number and at the same time, the first spool 54*a* of the line pressure control valve 24 is shifted in the right direction in FIG. 1 and FIG. 3 by the line pressure PH, so that the output pressure P1 is gradually reduced.

Here, Nep2 is a target rotation number of the rotation number Nep, and this target rotation number Nep2 is an optimal operation point in the hydraulic control device 10. The target rotation number Nep2 is the rotation number Nep that can reduce the output pressure P1 sufficiently while the workload of the second pump 28 (power consumption (current consumption) of the motor 30 and the second pump 28) is minimized. Here, the aim is to reduce the output pressure P1 to the target pressure P2 with the target rotation number Nep2. Note that the target pressure P2 is the pressure when the first oil is supplied to the low-pressure system 62, for example, and the pressure of the first oil when the minimal load is applied in the normal driving state of the first pump 20. Moreover, in FIG. 4, ΔP is a differential pressure between the line pressure PH0 and the target pressure P2 at Nep1 (ΔP=PH0−P2), and if the output pressure P1 has decreased to the target pressure P2, it is necessary that the second pump 28 pressurize the first oil by the differential pressure ΔP and supply the first oil that is pressurized to the oil passage 32 as the second oil.

In this case, while the rotation number Nep of the second pump 28 is increased, the first spool 54*a* is shifted gradually in the right direction in FIG. 1 and FIG. 3 by the line pressure PH. Thus, as the rotation number Nep is increased, the line pressure PH is maintained to PH0 and the output pressure P1 is reduced. However, when the rotation number Nep has reached Nep3 (Nep3<Nep2), the output pressure P1 pulsates as shown by a dashed line in FIG. 4.

This pulsation is caused because the hunting, that is, repeated opening and closing of the bypass valve 38 occur and the first spool 54*a* pulsates in the axial direction as the first oil and the second oil change in pressure when the rotation number Nep of the second pump 28 is increased. In this case, since the first pump 20 and the second pump 28 are both gear pumps, the output pressure P1 pulsates at the rotation number where the frequencies (discharging frequencies) of the number of teeth in the gears of each pump overlap (for example, the rotation number Nep3).

As a result, there is a concern that, due to the opening and closing of the bypass valve 38, the line pressure PH also pulsates and each lateral pressure of the driven pulley 36*a* and the driving pulley 36*b* is affected.

In FIG. 4, when the rotation number Nep is Nep2 or more, the line pressure PH slightly increases as the rotation number Nep is increased. This is because there is no oil passage that discharges the second oil from the driven pulley 36*a* and the driving pulley 36*b* and continuously supplying the second oil results in the increase in the line pressure PH.

<3. 2 Outline of Solution to Problem>

In view of the above, if the output pressure P1 pulsates, the hydraulic control device 10 can suppress the pulsation by performing one of the following two methods (the first operation and the second operation).

In the first operation, if the output pressure P1 pulsates, the driving of the second pump 28 is stopped (Nep~0) or the rotation number Nep of the second pump 28 is decreased to the rotation number of such a degree that the pulsation does not occur (the rotation number that satisfies Nep<Nep3, for example, an idling rotation number). In the first operation, instead of maintaining the line pressure PH to be high by the driving of the second pump 28, the hydraulic control is returned to the normal hydraulic control for the continuously variable transmission mechanism 36 using the first pump 20 or the like, and even in this case, the pulsation can be suppressed.

On the other hand, in the second operation, if the output pressure P1 pulsates, the rotation number Nep of the second pump 28 is increased once to a rotation number (first rotation number) Nep4 that is higher than the target rotation number Nep2. In the second operation, the workload of the second pump 28 (power consumption (current consumption) of the motor 30 and the second pump 28) is increased temporarily; however, since the line pressure PH becomes high, the hunting of the bypass valve 38 can be suppressed and the pulsation of the first oil can be suppressed. Note that the rotation number Nep4 may be a maximum rotation number Nepmax of the second pump 28, for example.

The first operation and the second operation are both achieved by using the output pressure sensor 26, the TCU 46, and the like in the hydraulic control device 10. That is to say, the output pressure sensor 26 sequentially detects the output pressure P1 and outputs the output pressure P1 to the TCU 46. The lateral pressure sensor 52 sequentially detects the line pressure PH and outputs the line pressure PH to the TCU 46. The engine rotation number sensor 70 sequentially detects the engine rotation number New (based on rotation number Nmp of the first pump 20) and outputs the engine rotation number New to the TCU 46. The driver 72 sequentially outputs the rotation number Nem (based on the rotation number Nep of the second pump 28) to the TCU 46.

The TCU 46 determines whether the output pressure P1 pulsates on the basis of, for example, the rotation number Nep of the second pump 28 based on the rotation number Nem and the output pressure P1. In this case, whether the pulsation occurs is determined by, for example, a pulsation detection method that is disclosed in Japanese Laid-Open Patent Publication No. 2012-219947.

Specifically, if the output pressure P1 is reduced, the TCU 46 calculates a difference between an estimated value P1e of the output pressure P1 and an actually measured value P1r of the output pressure P1 detected by the output pressure sensor 26, and if the calculated difference is more than an allowable value, the TCU 46 detects a first pulsation period (first pulsation frequency) included in the difference. Note that the estimated value P1e is an ideal pressure change characteristic of the output pressure P1 when the rotation number Nep is increased from Nep1 to Nep2 and the output pressure P1 is decreased from PH0 to the target pressure P2 as shown by a dashed line in FIG. 5.

Next, the TCU 46 detects a bias component of the pulsation for the first pulsation period (first pulsation frequency), and from the variation in detected bias component, determines whether there is a second pulsation period that is longer than the first pulsation period (second pulsation frequency that is lower than the first pulsation frequency).

The TCU 46 finally determines that the output pressure P1 pulsates if the second pulsation period (second pulsation frequency) can be detected.

Then, the TCU 46 controls the driving of the motor 30 through the driver 72 on the basis of the above determination result, and thus, controls the rotation number Nep of the second pump 28 and suppresses the pulsation of the output pressure P1. Specifically, in the case of the first operation, the TCU 46 decreases the rotation number Nem of the motor 30 to decrease the rotation number Nep of the second pump 28, so that the pulsation of the output pressure P1 is suppressed. In the case of the second operation, the TCU 46 increases the rotation number Nem of the motor 30 temporarily to increase the rotation number Nep of the second pump 28, so that the pulsation of the output pressure P1 is suppressed.

<3. 3 Specific Description of First Operation and Second Operation>

Here, the first operation and the second operation will be described with reference to FIG. 5 to FIG. 10. As described above, since the first operation is performed under the easy control of decreasing the rotation number Nep of the second pump 28, the second operation that is more complicated than the first operation will hereinafter be described mainly.

Figure 5:
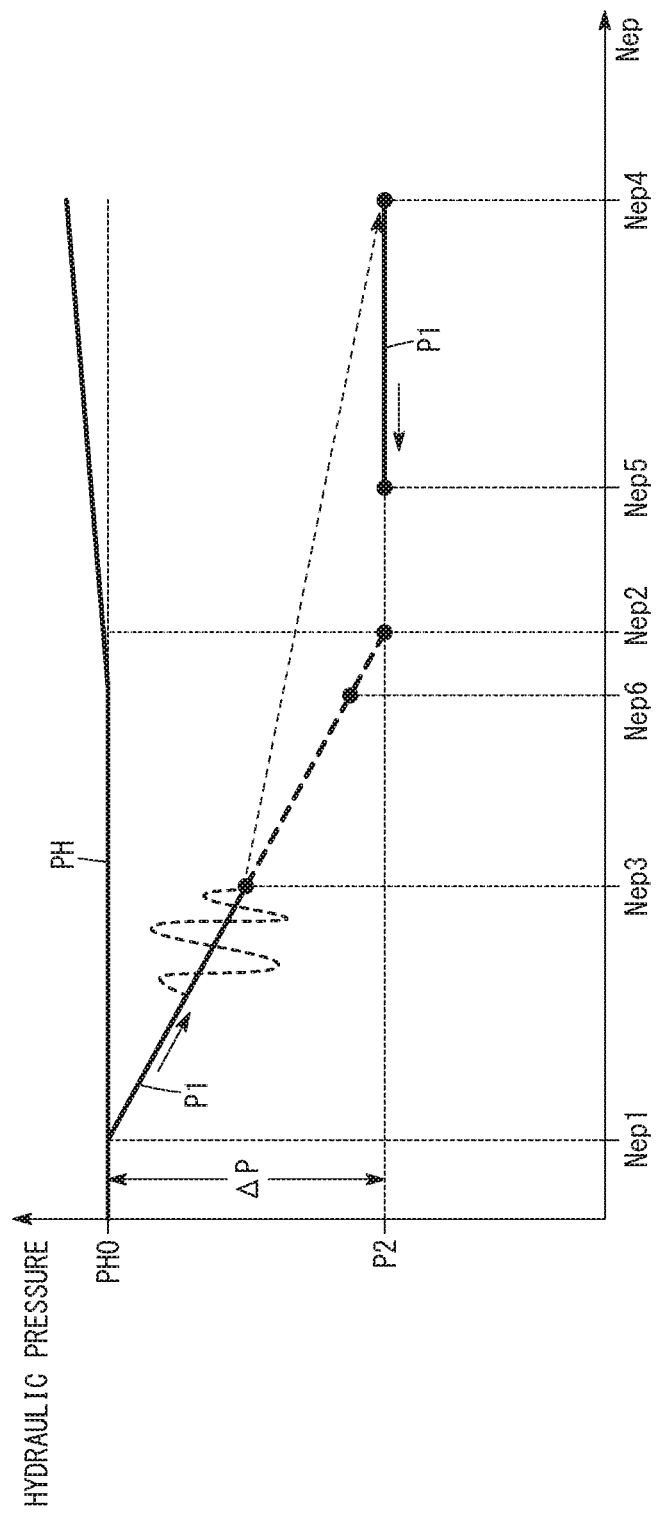
FIG. 5 is a diagram expressing a relation between the hydraulic pressure and the rotation number of the second pump.
Figure 6:
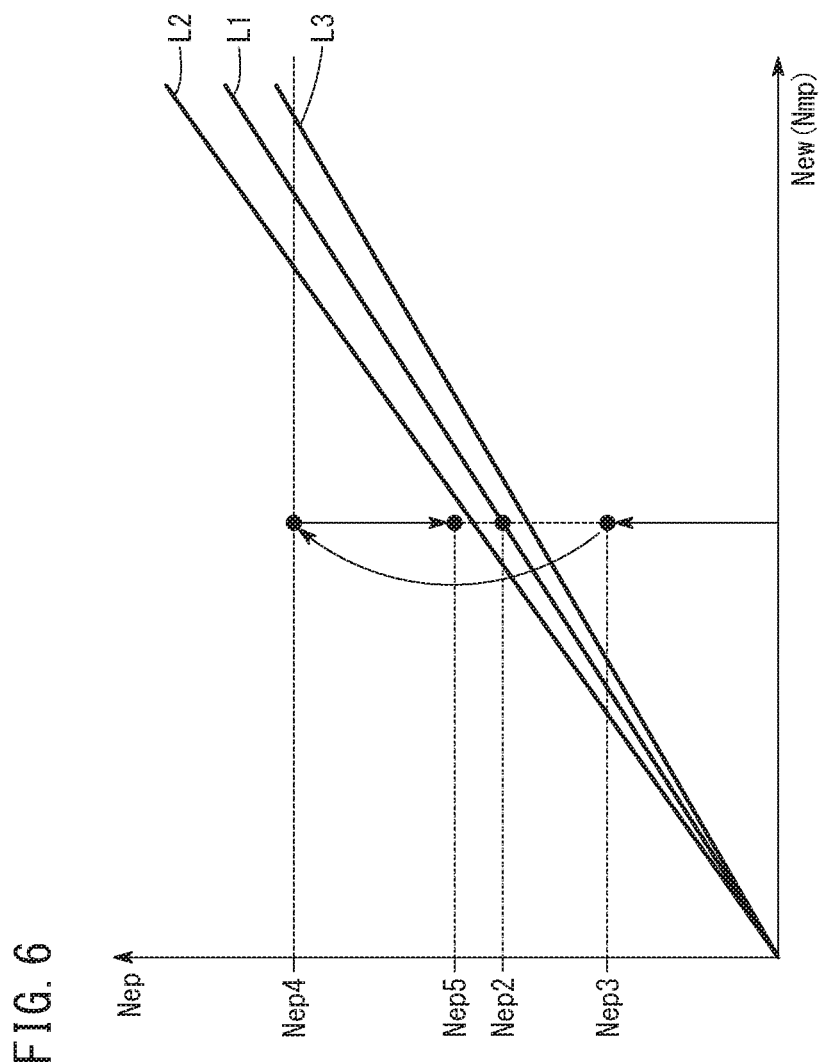
FIG. 6 is a diagram expressing a relation between an engine rotation number (rotation number of the first pump) and the rotation number of the second pump.

FIG. 5 and FIG. 6 are explanatory diagrams of the second operation. In FIG. 5 and FIG. 6, the output pressure P1 is reduced by increasing the rotation number Nep of the second pump 28 while the rotation number Nmp of the first pump 20 is maintained to be a certain rotation number.

In the second operation, in a case where the rotation number Nep is increased by driving the second pump 28 in a state that the first pump 20 is operated at the certain rotation number Nmp, if the rotation number Nep is increased to be higher than or equal to Nep1, the second oil is supplied to the fourth port 58d of the line pressure control valve 24 through the oil passages 32, 64 (see FIG. 1, FIG. 3). Thus, the first spool 54a shifts in the right direction in FIG. 1, FIG. 3, and FIG. 7A so that the first port 58a and the concave part 68c are gradually connected. Therefore, the first oil flows to the concave parts 68c, 68d and the output pressure P1 decreases (see FIG. 7A). That is to say, the output pressure P1 can be reduced by increasing the opening between the first port 58a and the concave part 68c as the rotation number Nep increases.

Then, if it is determined that the output pressure P1 pulsates by the pulsation detection method when the rotation number is Nep3, the TCU 46 controls the motor 30 through the driver 72 so as to increase the rotation number Nep of the second pump 28 from Nep3 to the first rotation number, Nep4 (for example, the maximum rotation number Nepmax) in one step as shown by a dashed arrow in FIG. 5. Thus, the second pump 28 becomes an overdrive state, and the motor 30 and the second pump 28 consume more current; however, since the pressure of the second oil (line pressure PH) becomes higher, the hunting of the bypass valve 38 can be suppressed. Note that the increase of the rotation number Nep in one step refers to the non-stop increase of the rotation number Nep from Nep3 to Nep4.

Figure 7A:
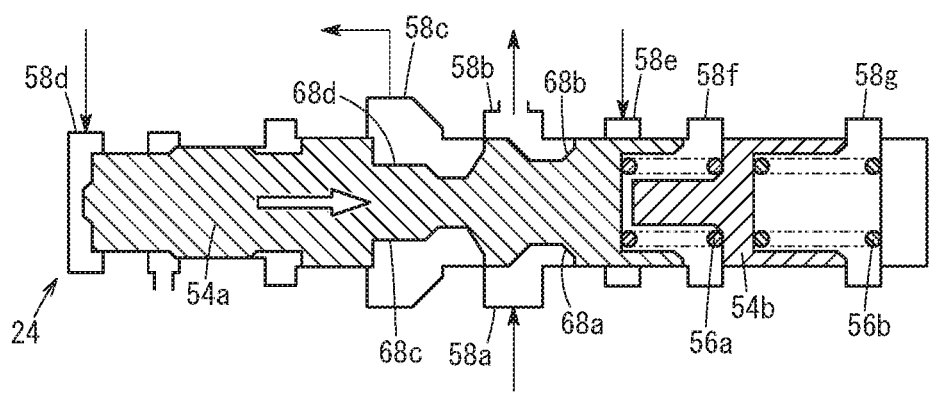
FIG. 7A and FIG. 7B are explanatory diagrams each illustrating an operation of a line pressure control valve.

In addition, since the pressure of the second oil (line pressure PH) that is supplied to the fourth port 58d through the oil passages 32, 64 becomes high, the first spool 54a shifts further in the right direction in FIG. 1, FIG. 3, and FIG. 7A, and the opening between the first port 58a and the concave part 68c becomes much larger. Thus, as shown in FIG. 5, the output pressure P1 rapidly decreases to the target pressure P2 by the increase of the rotation number Nep in one step.

Figure 7B:
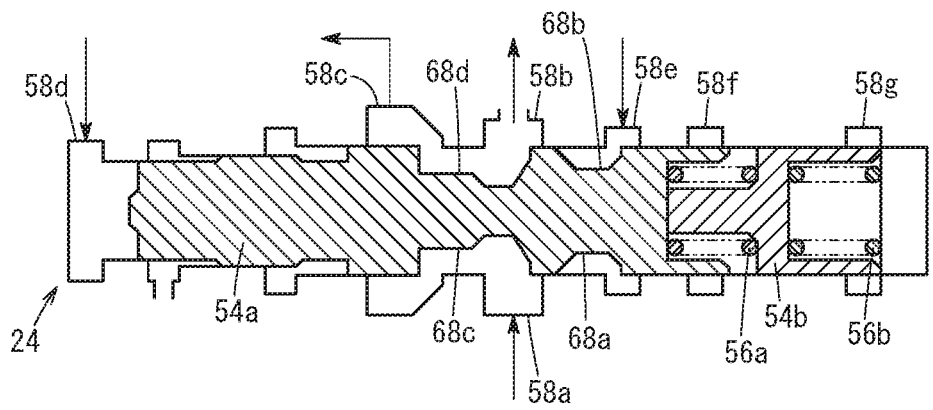

Note that if the rotation number Nep increases to make the second pump 28 become the overdrive state, there is a concern that the line pressure PH becomes suddenly high. In the present embodiment, the first spool 54a includes the concave part 68b as shown in FIG. 1 to FIG. 3 and FIG. 7A. Therefore, when the first spool 54a is shifted further in the right direction by the line pressure PH as shown in FIG. 7B, the concave part 68b and the fifth port 58e are connected to each other so that the second oil is discharged to the concave parts 68a, 68b. Thus, the line pressure PH can be maintained to be the predetermined pressure.

After that, the TCU 46 controls the driving of the motor 30 through the driver 72 so as to gradually decrease the rotation number Nep of the second pump 28 from Nep4. In this case, the TCU 46 gradually decreases the rotation number Nep to a rotation number Nep5 corresponding to a second rotation number that is a little higher than the target rotation number Nep2, paying attention to the change of the rotation number Nep and the output pressure P1 and the power consumption of the second pump 28 and the motor 30.

As illustrated in FIG. 6, at a line L1, a primary component of the discharging frequency of the first pump 20 (primary (1-order) component of the number of teeth in the gear of the first pump 20 (for example, six teeth)) and a primary component of the discharging frequency of the second pump 28 (primary (1-order) component of the number of teeth in the gear of the second pump 28 (for example, seven teeth)) overlap. In addition, a line L2 is set above the line L1 and a line L3 is set below the line L1. The line L2 is a line where the primary component of the discharging frequency of the first pump 20 and a 1.1-order component of the discharging frequency of the second pump 28 overlap. The line L3 is a line where the 1.1-order component of the discharging frequency of the first pump 20 and the primary component of the discharging frequency of the second pump 28 overlap.

Here, at least in the line L1, the primary component of the discharging frequency of the first pump 20 and the primary component of the discharging frequency of the second pump 28 coincide; therefore, it is predicted that the output pressure P1 pulsates more due to resonance or the like. In view of this, the TCU 46 controls the driving of the motor 30 to decrease the rotation number Nep to Nep5 (rotation number Nep near the line L2 that is set a little above the line L1) so that the rotation number Nep does not decrease to the line L1.

Note that in FIG. 6, for example, the rotation number Nep at the line L1 is the target rotation number Nep2. In this case, if the rotation number Nep decreases to Nep6 below the line L1, the output pressure P1 increases as shown in FIG. 5 (P1>P2). Therefore, the TCU 46 gradually decreases the rotation number Nep from Nep4 to Nep5 while monitoring the state so that P1 does not exceed P2 (avoiding the state in which P1 exceeds P2). Thus, even if the rotation number Nep increases temporarily and the workload of the second pump 28 (current consumption of the motor 30 and the second pump 28) increases, the pulsation of the output pressure P1 can be suppressed and the load on the first pump 20 can be reduced.

FIG. 8 is a timing chart of the first operation, and FIG. 9 is a timing chart of the second operation.

In the first operation, as shown in FIG. 8, in a state that the first pump 20 is driven, the driving of the second pump 28 is started by the driving control of the motor 30 from the TCU 46 at a time point t1 (servo determination: ON). Thus, the rotation number Nep of the second pump 28 increases as the time elapses after the time point t1, and the output pressure P1 (actually measured value P1r of the output pressure sensor 26) decreases.

At a time point t2, the actually measured value P1r pulsates and the actually measured value P1r and the estimated value P1e do not coincide. As a result, when the pulsation of the output pressure P1 is detected at a time point t3 by the pulsation detection method using the actually measured value P1r and the estimated value P1e, the TCU 46 decreases the rotation number Nem of the motor 30 so as to decrease the rotation number Nep of the second pump 28. Thus, after the time point t3, the actually measured value P1r increases to the line pressure PH and thus, a stable state in which the line pressure PH becomes the output pressure P1 can be quickly obtained. Therefore, the pulsation of the output pressure P1 can be suppressed.

On the other hand, in the second operation, as shown in FIG. 9, when the pulsation of the output pressure P1 is detected at the time point t3, the TCU 46 increases the rotation number Nem of the motor 30 so that the rotation number Nep of the second pump 28 is rapidly increased from Nep3 to Nep4. Thus, the line pressure PH increases and moreover, the actually measured value P1r rapidly decreases to the target pressure P2 and the output pressure P1 becomes the target pressure P2 where the first oil can be supplied to the low-pressure system 62. Therefore, the stable state with the low pressure can be quickly obtained and the pulsation of the output pressure P1 can be suppressed.

<3. 4 Process Inside TCU 46 (First Operation and Second Operation)>

Figure 10:
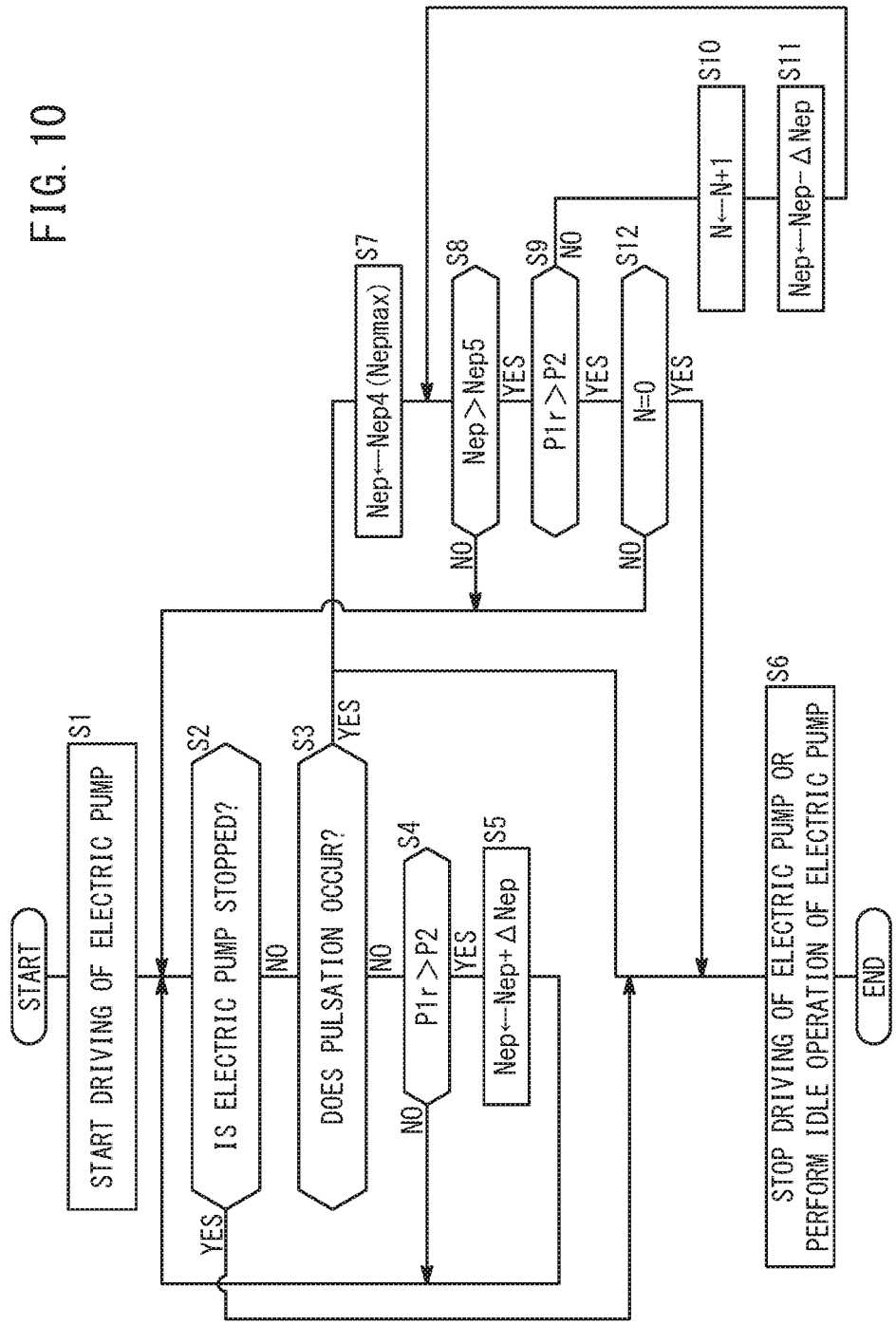
FIG. 10 is a flowchart expressing the first operation and the second operation.

Next, a process inside the TCU 46 for performing the first operation and the second operation will be described with reference to a flowchart in FIG. 10.

First, in step S1, in the state that the first pump 20 is driven, the TCU 46 drives the motor 30 through the driver 72 so as to start the second pump 28. In the next step S2, the TCU 46 determines whether to stop the driving of the second pump 28 because there is an external request over the response performance of the second pump 28 like in a case where a quick shift operation (quick shift) is requested.

If the request over the response performance of the second pump 28 has been made (step S2: YES), the TCU 46 determines to stop the driving of the second pump 28 and performs step S6. In step S6, the TCU 46 stops the driving of the motor 30 so as to stop the driving of the second pump 28.

On the other hand, if the request within the range of the response performance of the second pump 28 has been made (step S2: NO), the TCU 46 performs the aforementioned pulsation detection method in the next step S3 while continuing the driving of the second pump 28. If the second pulsation period (second pulsation frequency) cannot be detected in step S3 (step S3: NO), the TCU 46 determines that the output pressure P1 does not pulsate and performs the next step S4.

In step S4, the TCU 46 determines whether the actually measured value P1r has decreased to the target pressure P2. If the actually measured value P1r has not decreased to the target pressure P2 (P1r>P2, step S4: YES), the TCU 46 determines that the output pressure P1 can be reduced, and in the next step S5, the TCU 46 controls the driving of the motor 30 through the driver 72 so that the second pump 28 is driven at the new rotation number Nep that is increased from the current rotation number Nep by ΔNep. After step S5, the TCU 46 returns to step S2 and the process of and after step S2 is repeated.

On the other hand, in step S4, if the actually measured value P1r has decreased to the target pressure P2 (P1r≤P2, step S4: NO), the TCU 46 determines that it is unnecessary to reduce the output pressure P1 because the output pressure P1 maintains the target pressure P2. Thus, the process returns to step S2 and the process of and after step S2 is repeated.

If the second pulsation period (second pulsation frequency) is detected in step S3 (step S3: YES), the TCU 46 determines that the output pressure P1 pulsates.

Here, in the case of performing the first operation for the pulsation of the output pressure P1, the TCU 46 performs the next step S6. In step S6, the TCU 46 stops the driving of the motor 30 or rotates the motor 30 at the rotation number Nem that is low. Thus, the second pump 28 stops to drive or rotates at the rotation number Nep that is low, such as the idling rotation number. Therefore, the hydraulic control is returned to the normal hydraulic control for the continuously variable transmission mechanism 36 using the first pump 20, and the pulsation of the output pressure P1 can still be suppressed.

On the other hand, in the case where the second operation is performed for the pulsation of the output pressure P1, the TCU 46 performs step S7. In step S7, the TCU 46 controls the driving of the motor 30 through the driver 72 so that the second pump 28 is driven at the rotation number Nep4 (maximum rotation number Nepmax). Therefore, the second pump 28 becomes the overdrive state in which the rotation number Nep has rapidly increased from Nep3 to Nep4. Thus, the pulsation of the output pressure P1 is suppressed.

In the next step S8, the TCU 46 determines whether the current rotation number Nep is higher than the rotation number (for example, the rotation number Nep5) on the line L2 based on the current engine rotation number New. In this case, since Nep>Nep5 (step S8: YES), the TCU 46 performs the next step S9 and determines whether P1r>P2.

If P1r≤P2 in step S9 (step S9: NO), the TCU 46 determines that the actually measured value P1r has decreased to P2 because the rotation number Nep of the second pump 28 is rapidly increased to Nep4, and thus performs the next step S10. In step S10, the TCU 46 adds 1 to an arbitrary variable N (N←N+1), and performs the next step S11.

In step S11, the TCU 46 controls the driving of the motor 30 so that the second pump 28 is driven at the new rotation number Nep that is decreased from the current rotation number Nep by ΔNep. After step S11, the TCU 46 returns to step S8 and the process of and after step S8 is repeated. Thus, after the rotation number Nep is rapidly increased to Nep4, the second pump 28 can decrease the rotation number Nep to Nep5.

On the other hand, in the case where Nep Nep5 in step S8 (step S8: NO), the TCU 46 determines that, as a result of decreasing the rotation number Nep having increased up to Nep4, the rotation number Nep decreases to Nep5 or Nep6 in FIG. 5 and performs the process of and after step S2 again. Note that in the case where the rotation number Nep has decreased to Nep6 and the output pressure P1 pulsates, the pulsation detection method in step S3 is performed; therefore, the pulsation can be detected securely.

In addition, if P1r>P2 in step S9 (step S9: YES), the TCU 46 performs the next step S12. In step S12, the TCU 46 determines whether N is zero. If N is not zero (step S12: NO), the TCU 46 determines that the actually measured value P1r is higher than the target pressure P2 even after repeating the process of increasing the rotation number Nep to Nep4 and then decreasing the rotation number Nep several times. Thus, the process returns to step S2 and the process of step S2 is repeated.

On the other hand, if N is zero in step S12 (step S12: YES), the actually measured value P1r has not decreased to the target pressure P2 though the rotation number Nep is increased to Nep4; therefore, it is determined that the motor 30 and the second pump 28 consume power wastefully, so that instead of performing the second operation, the process of step S6 is performed.

[4. Effect of the Present Embodiment]

As described above, in the hydraulic control device 10 according to the present embodiment, in the case where the pressure of the first oil (output pressure P1, actual measurement pressure P1r) that is detected by the output pressure sensor 26 pulsates, the TCU 46 stops the driving of the second pump 28 or decreases the rotation number Nep of the second pump 28, as the first operation.

Thus, the first oil is directly supplied from the first pump 20 to the continuously variable transmission mechanism 36 through the bypass valve 38 or the second oil with the pressure close to the pressure of the first oil is supplied from the second pump 28 to the continuously variable transmission mechanism 36. As a result, the stable state can be obtained quickly, in which the pressure of the oil (line pressure PH) to be supplied to the continuously variable transmission mechanism 36 is the pressure (output pressure) P1 of the first oil or the pressure of the second oil that is close to the output pressure P1. Therefore, the hunting at the bypass valve 38 can be suppressed and the pulsation of the output pressure P1 can be suppressed quickly.

In addition, in the case where the output pressure P1 detected by the output pressure sensor 26 pulsates, the TCU 46 increases the rotation number Nep of the second pump 28 to the rotation number Nep4 (for example, the maximum rotation number Nepmax) that is higher than the target rotation number Nep2, as the second operation.

Thus, the workload of the second pump 28 increases temporarily; however, since the pressure of the second oil (line pressure PH) rapidly increases, the bypass valve 38 is maintained in the closed state due to the pressure of the second oil. The second oil with such a high pressure is supplied to the continuously variable transmission mechanism 36; therefore, the output pressure P1 can be reduced and the stable state with the low pressure can be quickly obtained. As a result, the hunting at the bypass valve 38 can be suppressed and the pulsation of the output pressure P1 can be quickly suppressed, and moreover, the load on the first pump 20 can be reduced.

In the second operation, the TCU 46 may decrease the rotation number Nep of the second pump 28 from the rotation number Nep4 to the rotation number Nep5 that is a little higher than the target rotation number Nep2. Thus, the workload of the second pump 28 can be cut while the pulsation of the output pressure P1 is prevented and the load on the first pump 20 is reduced; therefore, the second pump 28 can be efficiently operated near the target rotation number Nep2 corresponding to the optimal operation point. In addition, at the rotation number Nep that is lower than the target rotation number Nep2, the output pressure P1 becomes higher so that the first pump 20 is burdened more. Therefore, by setting the rotation number Nep to the rotation number Nep5 that is a little higher than the target rotation number Nep2, the above effect can be obtained easily.

In this case, the rotation number Nep5 is set to be the rotation number that is a little higher than the rotation number Nep (line L1) where the primary component of the discharging frequency of the first pump 20 and the primary component of the discharging frequency of the second pump 28 overlap. That is to say, at the rotation number Nep where the primary components overlap, the pulsation of the output pressure P1 may become large. In view the above, the rotation number Nep of the second pump 28 is decreased to the rotation number Nep5 so as not to get close to the line L1. Thus, the second pump 28 can be operated efficiently while the pulsation of the output pressure P1 is suppressed.

In addition, in the line pressure control valve 24, by shifting the first spool 54a in the axial direction using the line pressure PH as the pilot pressure, the supply of the first oil from the oil passage 22 to the oil passage 60 is adjusted and at the same time, the output pressure P1 can be reduced. As a result, while the pulsation of the output pressure P1 when the second pump 28 is driven is suppressed, the output pressure P1 can be reduced so as to reduce the load on the first pump 20.

In addition, the second pump 28 and the fifth port 58e of the line pressure control valve 24 are connected through the oil passage 66. Therefore, when the first spool 54a is shifted in the right direction using the line pressure PH as the pilot pressure, the oil passages 22, 66 are connected to each other so that the line pressure PH can be maintained to be a predetermined pressure. Thus, after the second pump 28 is driven, the line pressure PH can be prevented from becoming an abnormal state.

In addition, in a case where the pulsation of the output pressure P1 is not suppressed even by increasing the rotation number Nep of the second pump 28 to Nep4, the TCU 46 may stop the driving of the second pump 28 or decrease the rotation number Nep of the second pump 28 to the idling rotation number. Thus, an unnecessary workload of the second pump 28 can be avoided.

Note that the TCU 46 determines whether the output pressure P1 pulsates on the basis of the difference between the estimated pressure P1e and the actually measured value P1r of the output pressure P1, and if it is determined that the pulsation does not occur, the TCU 46 may increase the rotation number Nep of the second pump 28, and if it is determined that the pulsation occurs, the TCU 46 may stop the driving of the second pump 28 or decrease the rotation number Nep of the second pump 28 (first operation), or may increase the rotation number Nep of the second pump 28 to the rotation number Nep4 (second operation). Thus, on the basis of the determination result as to whether the output pressure P1 pulsates, the second pump 28 can be driven as appropriate.

In addition, the first pump 20 is a pump that is driven by the engine 16 and the second pump 28 is a pump that is driven by the motor 30. The first oil or the second oil is supplied to the continuously variable transmission mechanism 36 in the transmission 12, and the TCU 46 controls the rotation number Nep of the second pump 28 by controlling the driving of the motor 30. Thus, in the first operation, the power consumption of the motor 30 and the second pump 28 can be suppressed and the fuel efficiency of the vehicle 14 can be improved while the pulsation of the output pressure P1 is suppressed. On the other hand, in the case of the second operation, since the rotation number Nep of the second pump 28 increases to Nep4 once, the power consumption (current consumption) of the second pump 28 and the motor 30 increases temporarily. However, after that, by decreasing the rotation number Nep to the rotation number Nep5, the pulsation of the output pressure P1 can be suppressed and the fuel efficiency of the vehicle 14 can be secured.

[5. Modification of the Present Embodiment]

In the above description, the first oil or the second oil is supplied to the continuously variable transmission mechanism 36. However, the present embodiment is not limited to this description, and is also applicable in the case where the first oil or the second oil is supplied to another hydraulic operation unit in the transmission 12.

In the present embodiment, the hydraulic control device 10 may have any structure as long as the second pump 28 is connected between the first pump 20 and the hydraulic operation unit such as the continuously variable transmission mechanism 36 and the bypass valve 38 is connected to bypass the second pump 28.

The present invention is not limited to the above embodiment and may employ various structures on the basis of the description in the present specification.

What is claimed is:

1. A hydraulic control device including, between a first pump and a continuously variable transmission mechanism, a second pump and a non-return valve connected in parallel and configured to supply first oil from the first pump to the continuously variable transmission mechanism through the non-return valve, or pressurize the first oil that is supplied from the first pump with the second pump and supply the first oil that has been pressurized to the continuously variable transmission mechanism as second oil, the hydraulic control device comprising:
    a first flow passage configured to connect between the first pump, the second pump, and the non-return valve, and allow the first oil to flow therein;
    a pressure sensor configured to detect a pressure of the first oil flowing in the first flow passage; and
    a transmission control unit configured to control driving of the second pump,
    wherein if the pressure of the first oil that is detected by the pressure sensor pulsates, the transmission control unit is configured to increase a rotation number of the second pump to a first rotation number that is higher than a target rotation number,
    wherein the transmission control unit is configured to decrease the rotation number of the second pump from the first rotation number to a second rotation number that is higher than the target rotation number,
    wherein the second rotation number is a rotation number that is higher than a rotation number where a primary component of a discharging frequency of the first pump and a primary component of a discharging frequency of the second pump overlap.

2. The hydraulic control device according to claim 1, further comprising an electromagnetic valve provided at the first flow passage, and configured to connect between the first pump, the non-return valve, and the second pump, and configured to supply the first oil to a low-pressure system through a second flow passage when operating using a pressure of the first oil or the second oil as a pilot pressure,
    wherein in a case where the second pump supplies the second oil to the continuously variable transmission mechanism and the electromagnetic valve, the electromagnetic valve is configured to operate using the pressure of the second oil as the pilot pressure so as to supply the first oil to the second pump through the first flow passage and supply the first oil to the low-pressure system through the second flow passage.

3. The hydraulic control device according to claim 2, further comprising a third flow passage configured to connect between an output side of the second pump and the electromagnetic valve,
    wherein in a case where the second pump supplies the second oil to the continuously variable transmission mechanism and the electromagnetic valve, the electromagnetic valve is configured to operate using the pressure of the second oil as the pilot pressure so as to connect between the first flow passage and the third flow passage and maintain the pressure of the second oil to a predetermined pressure.

4. The hydraulic control device according to claim 1, wherein if increasing the rotation number of the second pump to the first rotation number fails to suppress pulsation, the transmission control unit is configured to stop the driving of the second pump or decrease the rotation number of the second pump to an idling rotation number.

5. The hydraulic control device according to claim 1, wherein:
   the transmission control unit is configured to determine whether the pulsation occurs on a basis of a difference between the pressure of the first oil detected by the pressure detection unit and an estimated value of the pressure;
   if it is determined that the pulsation does not occur, the transmission control unit is configured to increase the rotation number of the second pump; and
   if it is determined that the pulsation occurs, the transmission control unit is configured to increase the rotation number of the second pump to the first rotation number.

6. The hydraulic control device according to claim 1, wherein:
   the first pump is a pump that is driven by an engine of a vehicle;
   the second pump is a pump that is driven by a motor of the vehicle;
   the continuously variable transmission mechanism is a unit configured to operate when the first oil or the second oil is supplied in a transmission of the vehicle; and
   the transmission control unit is configured to control the driving of the motor so as to control the rotation number of the second pump.

* * * * *